United States Patent [19]

Muhr

[11] Patent Number: 4,638,703
[45] Date of Patent: Jan. 27, 1987

[54] SHEAR FOR DIFFERENT STRUCTURAL SHAPES

[76] Inventor: Karl-Heinz Muhr, In der Stesse 2, D-5952 Attendorn, Fed. Rep. of Germany

[21] Appl. No.: 735,919

[22] Filed: May 20, 1985

[30] Foreign Application Priority Data

May 18, 1984 [DE] Fed. Rep. of Germany ....... 3418423

[51] Int. Cl.$^4$ .............................................. B26D 9/00
[52] U.S. Cl. ....................................... 83/518; 29/560; 72/464; 83/559; 83/564; 83/620; 83/639
[58] Field of Search ................. 83/518, 549, 559, 564, 83/580, 639, 618, 620, 851, 829, DIG. 2; 72/442, 464; 29/34 R, 564, 564.7, 564.8, 565, 50, 560

[56] References Cited

U.S. PATENT DOCUMENTS 3,111,054 11/1963 Tishken .................................. 83/559
3,701,276 10/1972 Malmgren .............................. 83/518
4,067,252  1/1978 Peddinghaus ................... 83/DIG. 2

Primary Examiner—Frank T. Yost
Assistant Examiner—Hien H. Phan

[57] ABSTRACT

A shear for structural shapes in which the shear body is pivotal on the machine body between an erect position and an inclined position to bring respective pairs of blades into play at one and the same working plane for cutting the different structural shapes for which the blades are provided. The machine body can have a punch whose working height can correspond to that of the blades.

18 Claims, 7 Drawing Figures

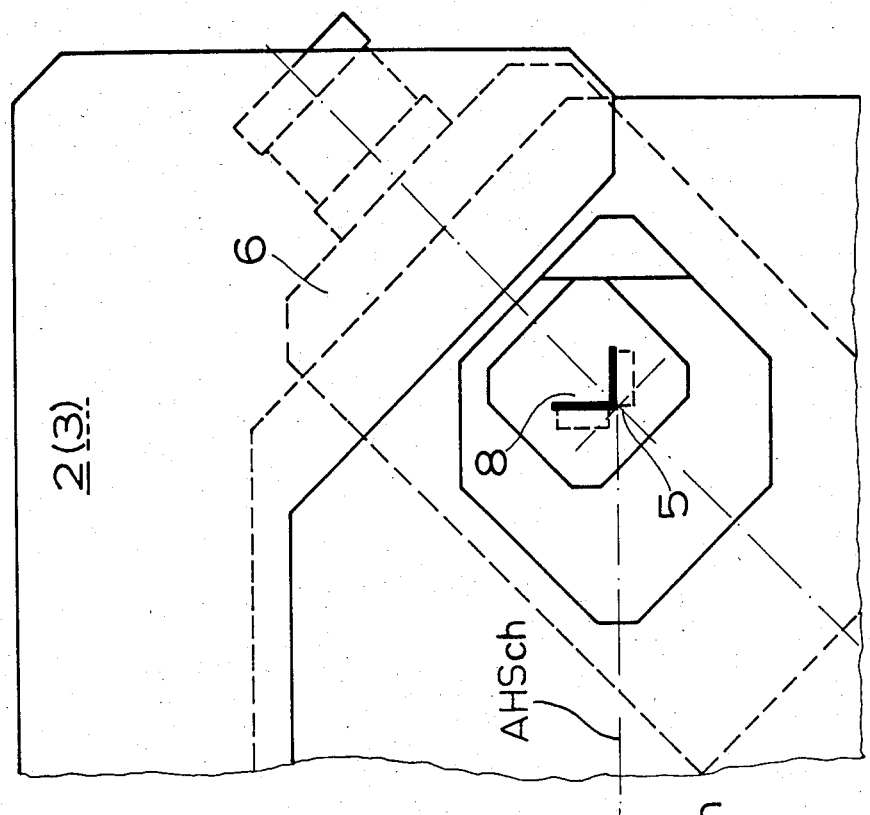
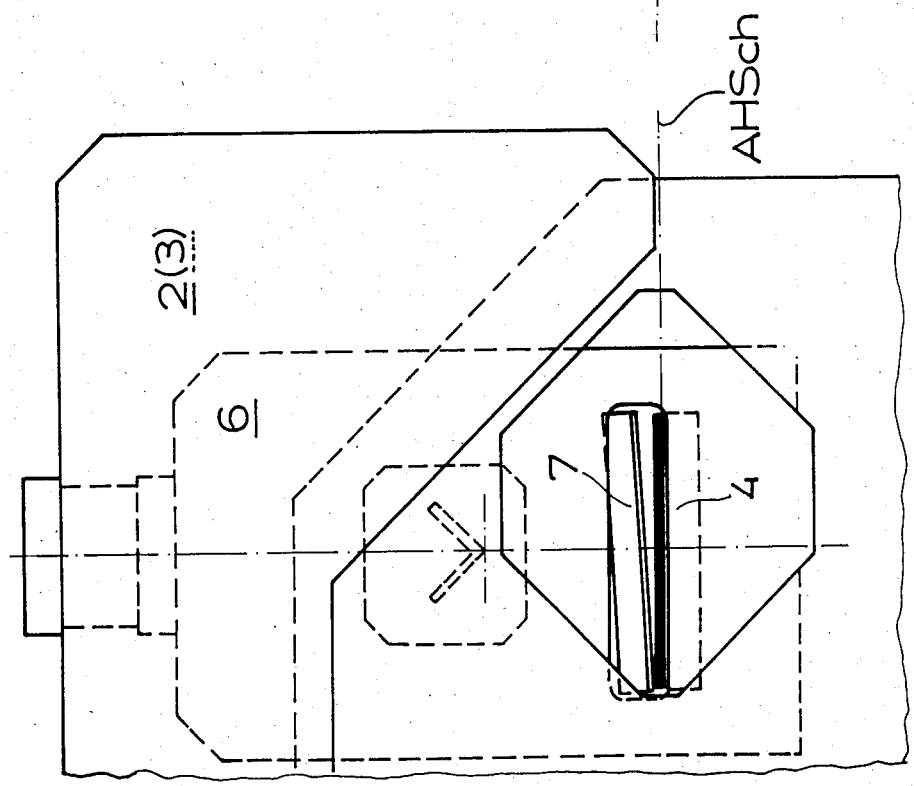
Fig. 3
Fig. 2

SHEAR FOR DIFFERENT STRUCTURAL SHAPES

FIELD OF THE INVENTION

My present invention relates to a shear for different structural shapes and, more particularly, to a shear for cutting lengths of metal profile, rod or bar stock of different cross sectional configurations. Specifically the invention relates to a shear having respective cutting blade arrangements for different structural shapes but designed so that the shearing position or location is at the same level, i.e. in the same horizontal working plane at least for one surface of each of the different structural shapes.

BACKGROUND OF THE INVENTION

The term "structural shape" is used herein to describe rod or bar-like structural material, generally of metal, of a variety of cross sections chosen to give various structural characteristics to the stock. Structural shapes include angles, I-beams, H-beams and channels, as well as round or polygonal cross section rod stock and flat bar stock which can be of rectangular cross ssection. These structural shapes are also known as profile, rod and bar steels or irons and generally the terms are used interchangeably at least when applied to steel structural members. They will be so used interchangeably hereinafter and thus any reference to profile steel and/or bar or rod steel and/or flat steel or flat bar steel or stock will be understood to refer to the structural shapes as above described.

It is known to provide shears, frequently referred to as power shears in which a slide carrying a movable blade is driven by hydraulic ram or some other power source and is equipped with means for severing different shapes and thus having associated blade arrangements oriented to accommodate the specific shapes.

In the past, however, the apparatus if it was capable of shearing different shapes without replacement of the blade assemblies, provided the blade assemblies one above another or were required to be of excessive width to accommodate the blade assemblies on a common horizontal plane.

A third alternative, of course, was to replace the working plate assembly for each different type of structural shape or stock cross section.

These systems had various disadvantages. For example, when the blade assemblies were vertically spaced, the different shapes had to be fed at different levels and the cut pieces were recovered at different levels. This made feeding a problem and, in addition, caused problems when the shear was associated with a punch or some other machine for acting upon the cut pieces.

It has already been mentioned that positioning a number of blade assemblies in the same plane but in horizontally spaced relationship gives rise to an excessive width of the machine which prevents it from being accommodated conveniently at a work site.

Finally, systems using replaceable blade assemblies and which require switchover for different structural shapes are complex and time-consuming to use since modification of the blade mounting may be required for blade replacement in switching over between one structural shape and another.

OBJECTS OF THE INVENTION

It is, therefore, the principal object of the present invention to provide a shear which overcomes the disadvantages of the aforedescribed prior art arrangements and which enables the cutting of steel stock of a variety of cross sectional configurations to be carried out effectively with a highly compact machine and with rapid switchover from one structural shape to another and further so as to have the working plane or level the same for the several structural shapes which can be cut by the apparatus.

Another object of my invention is to provide a machine for the aforedescribed purpose which can be utilized conveniently in conjunction with a punch or other tool so that different structural shapes can be processed thereon at the level at which the cut sections of the stock are obtained.

SUMMARY OF THE INVENTION

These objects and others which will become apparent hereinafter are attained, in accordance with the present invention by providing the working slide carrying the movable blades which are disposed above one another and are paired with fixed blades to cut respective steel structural shapes, so that this slide is swingable about a horizontal pivot axis between two positions, in a first of which a first pair of blades (including one fixed blade and one blade carried by the slide) lie at a given working level or horizontal plane, and a second position in which a second pair of blades (including a fixed blade and a movable blade on the slide) lies at the same working level or at the same plane, at least as to part of the blade arrangement for the cutting of another steel shape.

As a result, by a simple pivot action, e.g. of a shear body mounted in a machine body for such pivotal action and carrying the slide and the mechanism for driving the slide for the cutting action, the same working level is provided for two distinct sets of blades for two different profiles or structural shapes.

The first position can be an erect position of this body in which the second pair of blades lies directly above the first pair of blades. The second position can be an inclined position in which the second pair of blades lies at the working level and the first pair of blades lies below the working level, and below the second pair of blades, but is aligned below the latter along an incline.

BRIEF DESCRIPTION OF THE DRAWING

The above and other objects, features and advantages of the present invention will become more readily apparent from the following description, reference being made to the accompanying drawing in which:

FIG. 1A is a section taken generally along the line 1A—1A of FIG. 1 with the shear body in its erect position as represented by dot-dash lines in FIG. 1;

FIG. 1B is an elevational view of this shear body outside the machine body;

FIG. 3 is a view similar to FIG. 2 showing the shear body in its position cutting angle steel stock;

SPECIFIC DESCRIPTION

Figure 1:
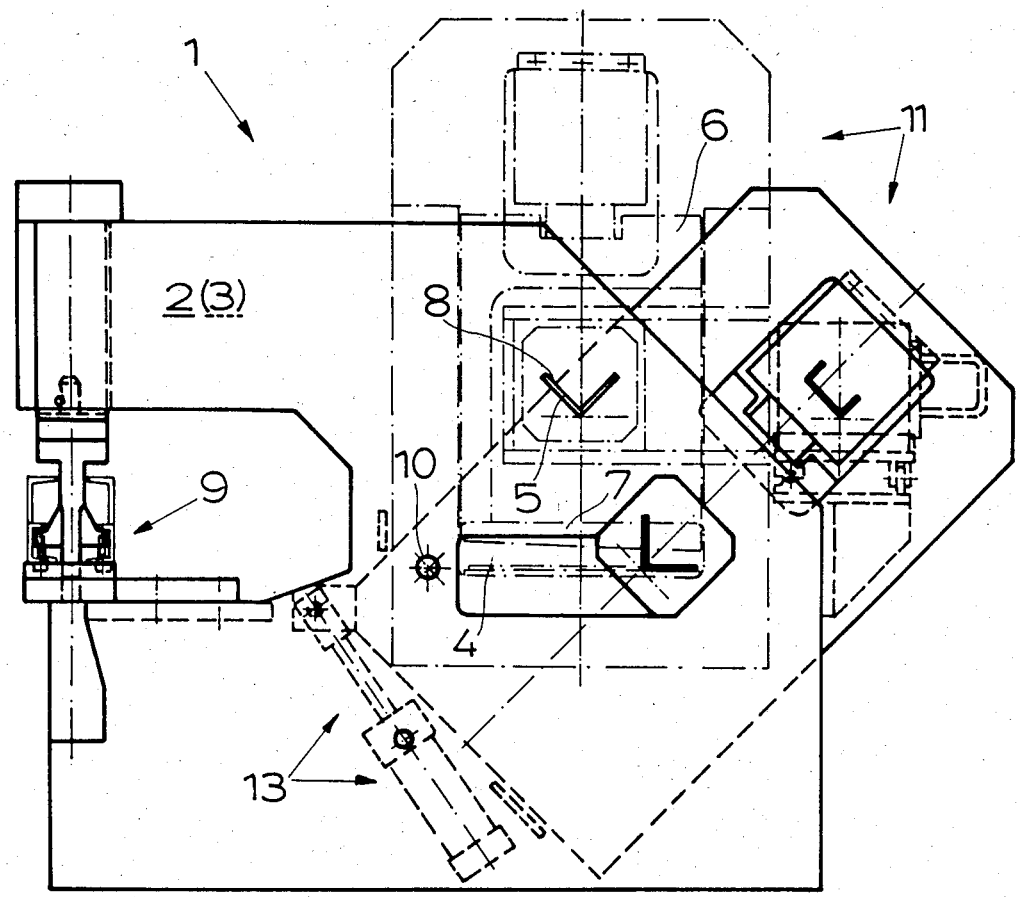
FIG. 1 is a highly schematic side elevational view of a first embodiment of the invention as applied to a shear for cutting angle profiles and flat bar stock.
Figure 2:
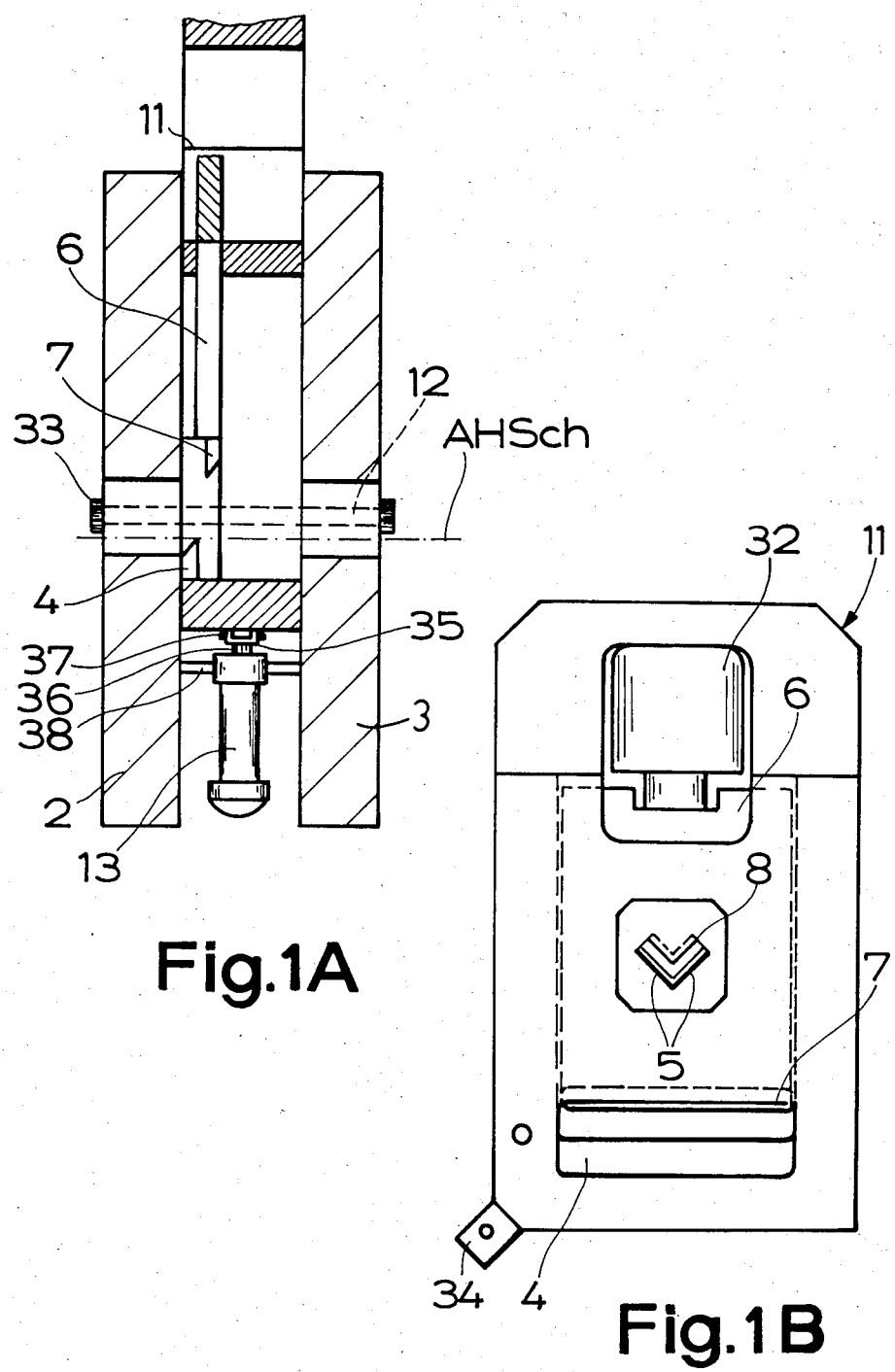
FIG. 2 is a view greatly enlarged with respect to FIG. 1 of a portion of a machine generally similar to FIG. 1 but modified as to the machine housing, showing the shear body in its first position for cutting bar stock.

In FIGS. 1–3, have shown a profile steel and/or rod steel and/or flat bar steel shear which has been illustrated specifically as a shear for the cutting of angle and flat bar stock and which comprises a machine body 1 defined by two body plates 2 and 3, the machine body having mounted therein for pivotal movement about an axis 10, a shear body 11 which is disposed between the two plates 2 and 3 The shear body 11 carries two blades or sets of blades represented at 4 and 5, respectively and disposed one below the other as can be seen from the erect orientation of the shear body represented in FIG. 1B.

The working slide 6 is guided on the shear body 11 and carries respective blades 7 and 8 referred to hereinafter as the movable blades.

As can be seen from FIGS. 1A, 1B, 2 and 3, the blade pair 4, 7 consists of linear blades adapted to shear flat bar stock between them while the blade pair 5, 8 consists of angled blades so oriented that angle stock can be sheared between them, the body 11 and the slide 6 being provided with the requisite openings to allow insertion of the stock and carrying a hydraulic cylinder 32 representing a power mechanism for driving the slide 6.

From FIG. 1 it will be apparent further that the machine body 1 also carries another tool, namely a punch or stamping unit which has been represented generally at 9 and can be conventional so that it will not be described in any greater detail, although this stamp or punch can be used for example to punch holes in a length or section of stock severed by the shear.

In accordance with the invention, as can be readily ascertained from FIGS. 1, 2 and 3, in the first operating position of the shear body 11, represented in dot-dash lines in FIG. 1, the first pair of blades 4 and 7 lie at a given working height or horizontal plane AHSch, whereas in the second position, represented in solid lines, the second pair of blades 5, 8 cooperate to shear the angle stock at the same working level AHSch, at least as to one flange of the angle. The first position has been represented also in FIG. 2 while the second position is represented in FIG. 3 and, as to FIG. 4, the first position has been shown in solid lines while the second position is shown in broken line.

While the fixed blades can be provided at given locations on the machine body directly, I prefer to provide them as illustrated upon the shear body 11 carrying the slide 6. The bolt 33 traversing the plates 2 and 3 of body 1 and the shear body 11 forms a pivot pin 12 substantially at the plane AHSch for the shear body and a hydraulic piston-and-cylinder arrangement 13 can effect the pivoting action. Specifically, one corner of the body 11 has a lug 34 which is engaged by a fork 35 of the piston rod 36 of the cylinder 13 and is traversed by a pin 37, the cylinder being pivotally mounted in the machine body at 38.

To prevent excessive swing of the shear body 11, stops 30 and 31 are provided to engage the shear body in the first and second working positions respectively.

While these stops and the cylinder 13 generally suffice to hold the shear body in its working positions, it has been found to be advantageous to provide a latch or bracing arrangement which serves this end. This arrangement has been shown in FIG. 4 in which, in addition, the cylinder for actuating the shear body 111 in the machine body 101 having the plates 102 has been represented at 113 and is pivotally connected to the shear body 111 at a location 134 disposed more or less centrally of the shear body. In this arrangement, moreover, a punch 109 is provided and the shear body 111 is mounted by the pin 112 so as to pivot about the axis 110 in the plane AHSch.

This apparatus also comprises a motor-driven pump 40 for supplying the hydraulic devices with hydraulic fluid drawn from a reservoir 41.

Figure 4:
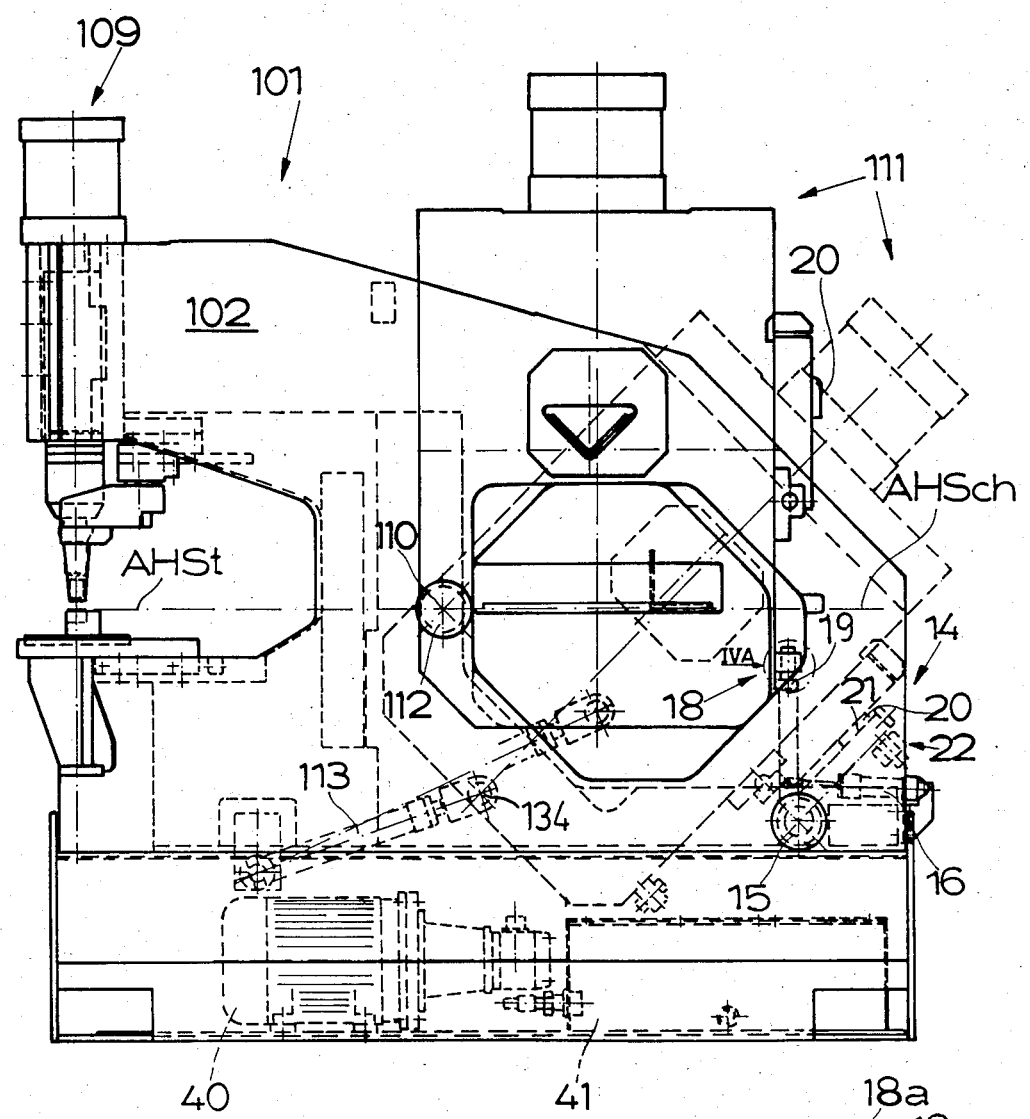
FIG. 4 is a view similar to FIG. 1 illustrating another embodiment of the machine.

In this embodiment, therefore, we provide a brace device 14 which is swingably mounted on the machine body 101 at a pivot pin 15 and is displaceable between an inclined position shown in dot-dash lines in FIG. 4 and a vertical position shown partially in broken lines because it is behind the proximal plate 102 of the machine body. The piston-and-cylinder arrangement 16 is hydraulically actuated.

Figure 4A:
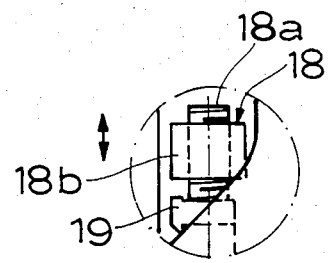
FIG. 4A is a detail of the region IVA of FIG. 4.

In order to brace the shear body 111 in its first or erect position, the shear body can have an abutment 18 which has been shown in somewhat greater detail in FIG. 4A, this abutment comprising a screw 18a and a nut 18b. The screw can thus be adjusted to set the stop position with respect to locking nose 19 carried by the bracing device 14.

Consequently, when the shear body 111 is to be retained in its upper position, the brace device 14 is swung upwardly to position the nose 19 below the abutment screw 18a and, since the device 14 is then located to the left of the axis of its pivot 15, a downward force on it does not tend to rotate it and the device acts in the counterclockwise sense.

However, when it is desired to allow pivoting of the shear body 111, the device 14 is swung into the clockwise sense by the piston 16 into a position in which the device 14 comes to rest against abutment 22 which corresponds to the adjustable abutment 18 in construction. In the first position, therefore, the pin 112 directly and the pin 15 indirectly via the bracing device 14 carry the load of the shear body 111.

The device 14, however, also braces the shear body 111 in its second position and in this position, a ball-shaped formation 20 carried by the shear body comes to rest against the device 14 when the latter engages the abutment 22. The abutment surface 21 of the device 14 is the lateral surface thereof.

In the second position shown in broken lines in FIG. 4, the shear body is supported on the one hand by the pivot pin 112 and on the other hand by the pivot pin 15 and the abutment 22 on the machine body.

In order to swing the shear body 111 from its second position into the first position, the cylinder 113 is extended to pivot the shear body in the counterclockwise sense, whereupon the device 14 is swung by the cylinder 16 in the counterclockwise sense to brace beneath the abutment 18. Conversely to swing the shear body into its second position, the device 14 is first retracted and then the cylinder 113 is contracted to bring the shear body 111 to bear against the surface 21 of the device 14 now supported by the abutment 22 so that the shear body lies at an angle of 45° to the vertical. Shearing is then effected as described for the embodiment of FIG. 1, it being noted that the working plane AHSch for shearing with both pairs of blades coincides with the working plane AHSt of the punch 109 so that transfer of the cut pieces to the punch is greatly simplified.

I claim:
1. A shear for severing at least two different structural shapes, comprising:
   a machine body;

a shear slide pivotally mounted on said machine body to swing about a horizontal axis between a first operating position and a second operating position angularly offset from said first position about said axis, said shear slide being capable of rectilinear movement;

a pair of fixed blades spaced apart in the direction of said rectilinear movement when said slide is in said first operating position and oriented to cut respective structural shapes; and a respective movable blade on said slide juxtaposed and paired with each of said fixed blades and cooperating with the respective fixed blade to sever the respective structural shape upon said rectilinear movement of said slide, said blades being positioned with respect to said axis so that each pair of blades is disposed at a common given working height in a respective severing position thereof.

2. The shear defined in claim 1 wherein said machine body is provided with a punch whose working height corresponds to the working height of said pairs of blades.

3. A shear for severing at least two different structural shapes, comprising:

a machine body comprising a pair of plates;

a shear body pivotably mounted on said machine body between said plates to swing about a horizontal axis between a first operating position and a second operating position angularly offset from said first position about said axis;

a slide mounted on said shear body for rectilinear movement thereon;

means on said shear body for imparting said rectilinear movement to said slide;

a pair of fixed blades on said shear body spaced apart in said direction of rectilinear movement when said shear body is in said first operating position and oriented to cut respective structural shapes; and a respective movable blade on said slide juxtaposed and paired with each of said fixed blades and cooperating with the respective first blade to sever the respective structural shape upon said rectilinear movement of said slide, said blades being positioned with respect to said axis so that each pair of blades is disposed at a common given working height in a respective severing position thereof.

4. The shear defined in claim 3 wherein said shear body is guided for movement between said positions within said machine body.

5. The shear defined in claim 3 wherein said shear body is pivotally mounted in said machine body by a pivot pin.

6. The shear defined in claim 3, further comprising a hydraulic piston-and-cylinder arrangement connected to said shear body for displacing same between said positions.

7. The shear defined in claim 3 wherein said axis is disposed on one side of said shear body, said shear further comprising a bracing device disposed on an opposite side of said shear body to support said shear body in at least one of said positions.

8. The shear defined in claim 7 wherein said bracing device is mounted by a pivot pin on said machine body.

9. The shear defined in claim 7 further comprising a hydraulic piston-and-cylinder arrangement connected to said bracing device for swinging it into engagement with said shear body in said first position.

10. The shear defined in claim 9 wherein said bracing device is provided with an abutment head engageable with said shear body in said first position.

11. The shear defined in claim 10 wherein said shear body is provided with an abutment engageable with said head in said first position.

12. The shear defined in claim 11 wherein said abutment is adjustable.

13. The shear defined in claim 10 wherein at least one of said head and said shear body is provided with a retaining nose for preventing said head from slipping with respect to said shear body.

14. The shear defined in claim 7 wherein said bracing device is swingable into a position in which it is engaged by a surface on said shear body when said shear body is swung into said second position.

15. The shear defined in claim 14 wherein said surface is juxtaposed with an abutment surface of said device.

16. The shear defined in claim 14 wherein said surface has a ball shaped configuration.

17. The shear defined in claim 7 wherein said machine body is provided with an abutment forming a stop for said device in said second position of said shear body.

18. The shear defined in claim 17 wherein said abutment is adjustable.

* * * * *